US012520191B2

(12) United States Patent
Vaughan et al.

(10) Patent No.: US 12,520,191 B2
(45) Date of Patent: Jan. 6, 2026

(54) SYSTEMS AND METHODS TO ASSESS PERFORMANCE OF COMMUNICATION NETWORKS

(71) Applicant: eSpace Networks, Inc., Dover, DE (US)

(72) Inventors: William Vaughan, Atlanta, GA (US); Alwin Tom, Kolapra (IN); Luis Carrion, Laredo (ES); Akhil Sudhakaran, Pathanamthitta (IN); Shadrach Retnamony, Pembroke Pines, FL (US)

(73) Assignee: eSpace Networks, Inc., Dover, DE (US)

(*) Notice: Subject to any disclaimer, the term of this patent is extended or adjusted under 35 U.S.C. 154(b) by 352 days.

(21) Appl. No.: 18/222,446

(22) Filed: Jul. 15, 2023

(65) Prior Publication Data

US 2024/0056882 A1 Feb. 15, 2024

Related U.S. Application Data

(60) Provisional application No. 63/406,651, filed on Sep. 14, 2022, provisional application No. 63/389,732, filed on Jul. 15, 2022.

(51) Int. Cl.
*H04W 28/02* (2009.01)

(52) U.S. Cl.
CPC ... *H04W 28/0289* (2013.01); *H04W 28/0242* (2013.01); *H04W 28/0284* (2013.01)

(58) Field of Classification Search
None
See application file for complete search history.

(56) References Cited

U.S. PATENT DOCUMENTS

| | | | |
|---|---|---|---|
| 9,413,676 B2* | 8/2016 | Bandyopadhyay | ... H04L 47/522 |
| 2009/0175191 A1* | 7/2009 | Lin | ..... H04L 43/0894 370/253 |
| 2016/0337223 A1* | 11/2016 | Mackay | ............. H04L 43/0894 |
| 2021/0184785 A1* | 6/2021 | Small | .................... H04L 1/0002 |
| 2023/0147437 A1* | 5/2023 | Tourrilhes | ............. H04L 47/215 370/252 |

* cited by examiner

*Primary Examiner* — Mohamed Ibrahim
(74) *Attorney, Agent, or Firm* — A. Robert Weaver; The Brickell IP Group, PLLC

(57) ABSTRACT

A communications network may include a bandwidth system and a statistics system in order to assess data packet loss in a communications network. The bandwidth system may operate to mark data packets as either high or low priority and to receive feedback information on data packet loss and jitter. The statistic system may operate to collect metrics relating to the performance of radio frequency equipment as well as the weather or environmental conditions of a local area network. Embodiments of these systems may allow for identification of data packet loss due to specific sources such as radio frequency intervention, congestion, and burstiness. Visualization outputs may also be provided to benefit the operator of the system.

16 Claims, 16 Drawing Sheets

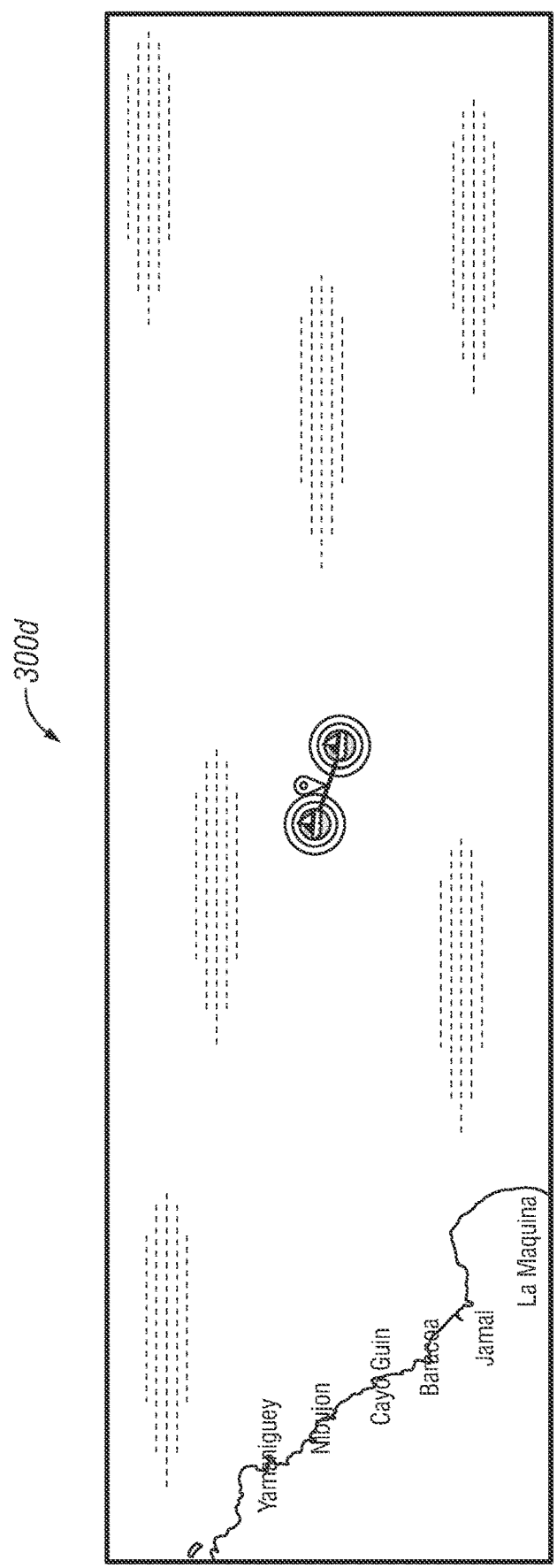

SYSTEMS AND METHODS TO ASSESS PERFORMANCE OF COMMUNICATION NETWORKS

CROSS REFERENCE TO RELATED APPLICATIONS

This application claims the benefit of U.S. Provisional Application No. 63/389,732 filed Jul. 15, 2022, and U.S. Provisional Application No. 63/406,651 filed Sep. 14, 2022, the disclosures of which are hereby incorporated herein by reference in their entirety.

FIELD OF THE DISCLOSURE

This disclosure relates generally to the assessment and prediction of the performance of communication networks, and more specifically wireless communication networks for use in a mobile environment such as a ship or airplane.

BACKGROUND

The radio frequency (RF) infrastructure in a mobile environment, such as a ship or airplane, includes a number of different RF components or equipment such as antennas, modems and RF Switches (Mediators). The overall RF performance is determined by the combined performance of all these components or equipment.

One assessment of performance is packet loss, which is a well-known problem in the field of communication networks. Packet loss occurs when one or more packets fail to arrive at their destination during transmission. A practical effect of packet loss could be an interrupted or choppy audiovisual transmission, or in a severe example a complete loss of the transmission. Packet loss may be caused by a number of reasons. For example, packet loss may be due to congestion, which is known in the industry as a reduction in the quality of service that occurs when a transmission link carries more data than it can handle. Put another way, this is when the network attempts to transmit data in excess of the signal's bandwidth. The packet loss caused by congestion is typically due to queue overruns within the network. To minimize packet loss due to congestion, bandwidth estimation is applied to detect and minimize such loss. Bandwidth estimation is known in the industry as the process of determining how much data can be sent on a link before packet loss due to congestion is likely to be experienced. Transport level protocols, such as TCP and QUIC, implement bandwidth estimation to minimize retransmissions while filling the available bandwidth.

RF performance, including packet loss, may also be caused by radio frequency interference (RFI), which is when undesired radio frequency signals disrupt the transmission. For example, satellite communications are subject to RFI from multiple sources, including weather, blockage, location, etc. This type of packet loss is very different from the packet loss caused by congestion and requires separate and distinct detection and solutions from packet loss due to congestion. For example, bandwidth estimation may not account for RFI, and while reducing the packet transmission rate would generally help with congestion it would have no effect on loss due to RFI.

Burstiness is yet another cause for packet loss. Burstiness occurs when there is a sudden increase or decrease in data transmitted. An unexpected spike in network traffic may exceed the available bandwidth, leading to queuing delays or a possible failure in transmission. Sending pacing traffic is the focus of known techniques for minimizing packet loss due to burstiness. Other sources of packet loss may also be caused by faulty or defective equipment, such as networking hardware or wiring.

Typical congestion control algorithms monitor latency buildup based on packet/ack round trip times. Latency build-up is a typical precursor to packet loss and a known congestion control algorithm can use this to reduce the packet rate before packet loss happens. Most protocols that focus on the reduction of bandwidth use this approach. However, due to high traffic demands in communication networks, packet loss continues to constitute a problem.

Additionally, while bandwidth estimation is able to detect packet loss due to congestion, so that a network operator can react by reducing the packet rate, non-congestion packet loss must be separately detected and factored out. In order to trouble shoot the multitude of potential issues related to the performance of the RF network, the Information Technology (IT) officers charged with overseeing the performance of the wireless network will need an insight into all these metrics. However, this has not been easy or intuitive, as the IT officer may have to look into multiple visualizations and data sources and correlate these to reach a determination as to the cause of a fault and as to how to troubleshoot the system's substandard performance.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure, a network communications system include a bandwidth system and a radio frequency statistic system. The bandwidth system may include an inspector module for receiving data packets from a data source, a bandwidth estimation module for dequeuing the data packets and marking the data packets as either high priority or low priority, a local modem for processing the data packets by dequeuing the data packets with the high priority data packets being dequeued at a higher ratio than the low priority data packets, a remote modem for receiving processed data pockets, a remote bandwidth estimation module for periodically transmitting feedback information from the remote modem to the local modem, wherein the feedback information includes the timing and number of data packets received, and a local bandwidth estimation module for receiving the feedback information transmitted to the local modem and determining packet loss due to congestion or burstiness. The radio frequency statistics system may include a radio frequency metrics module for collecting radio frequency metrics, a weather module for collecting weather metrics, and a visualization module for selectively displaying radio frequency metrics and weather metrics on an output device.

Another embodiment of the disclosure is a method for estimating bandwidth and controlling packet rate using at least two queues. The method may include receiving data packets from a source, categorizing the data packets into traffic class queues, dequeuing the data packets, processing the data packets, receiving the processed data packets and forwarding the processed data packets to a remote bandwidth estimation module, and at the remote bandwidth estimation module, receiving the processed data packets and periodically transmitting feedback information.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

BRIEF DESCRIPTION OF THE FIGURES

FIGS. 13-15 illustrates an exemplary graphical user interface in accordance with one embodiment.

DETAILED DESCRIPTION OF THE DISCLOSURE

Figure 1:
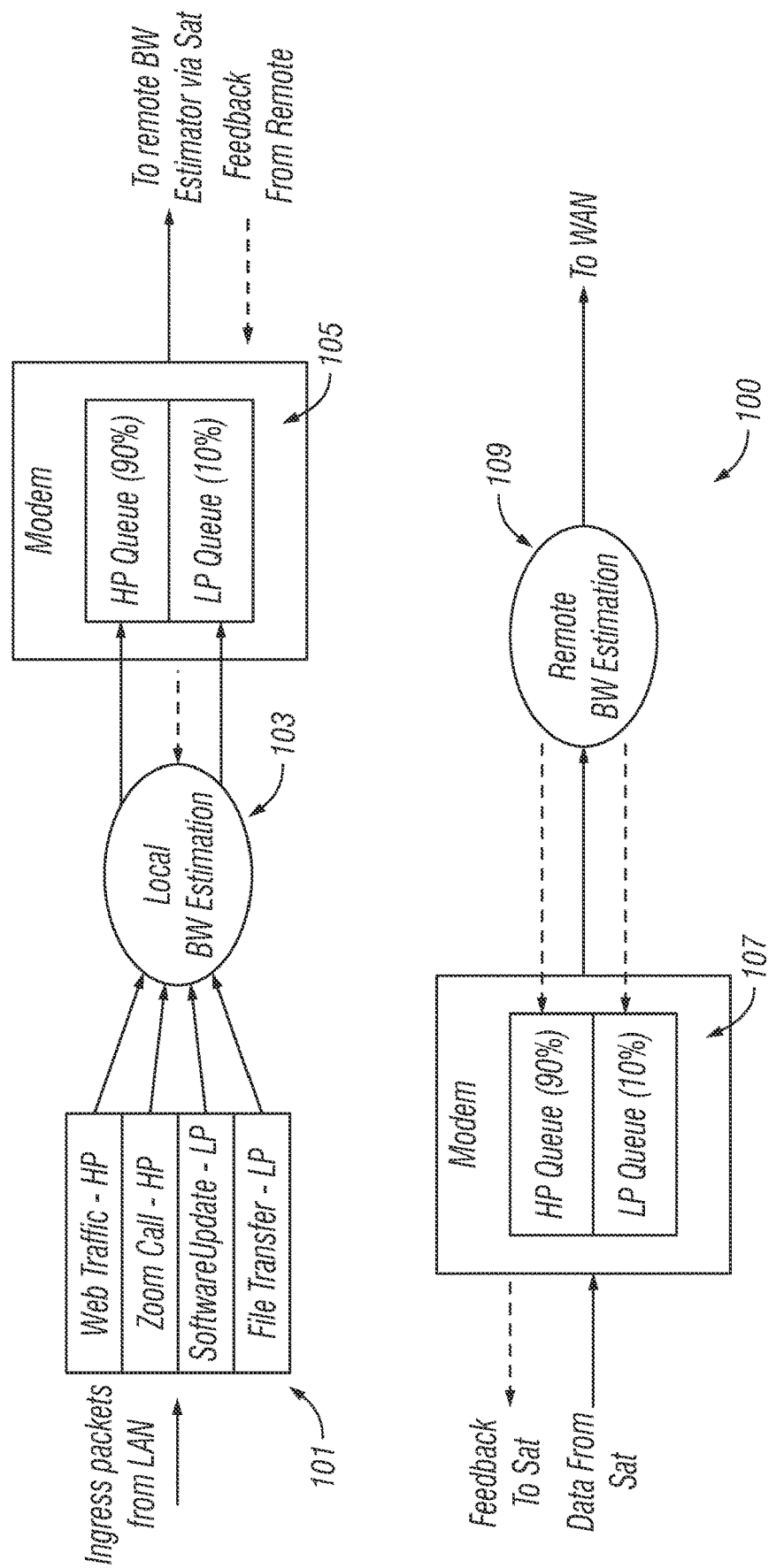
FIG. 1 illustrates an embodiment of a system for estimating bandwidth and controlling packet rate.
Figure 2:
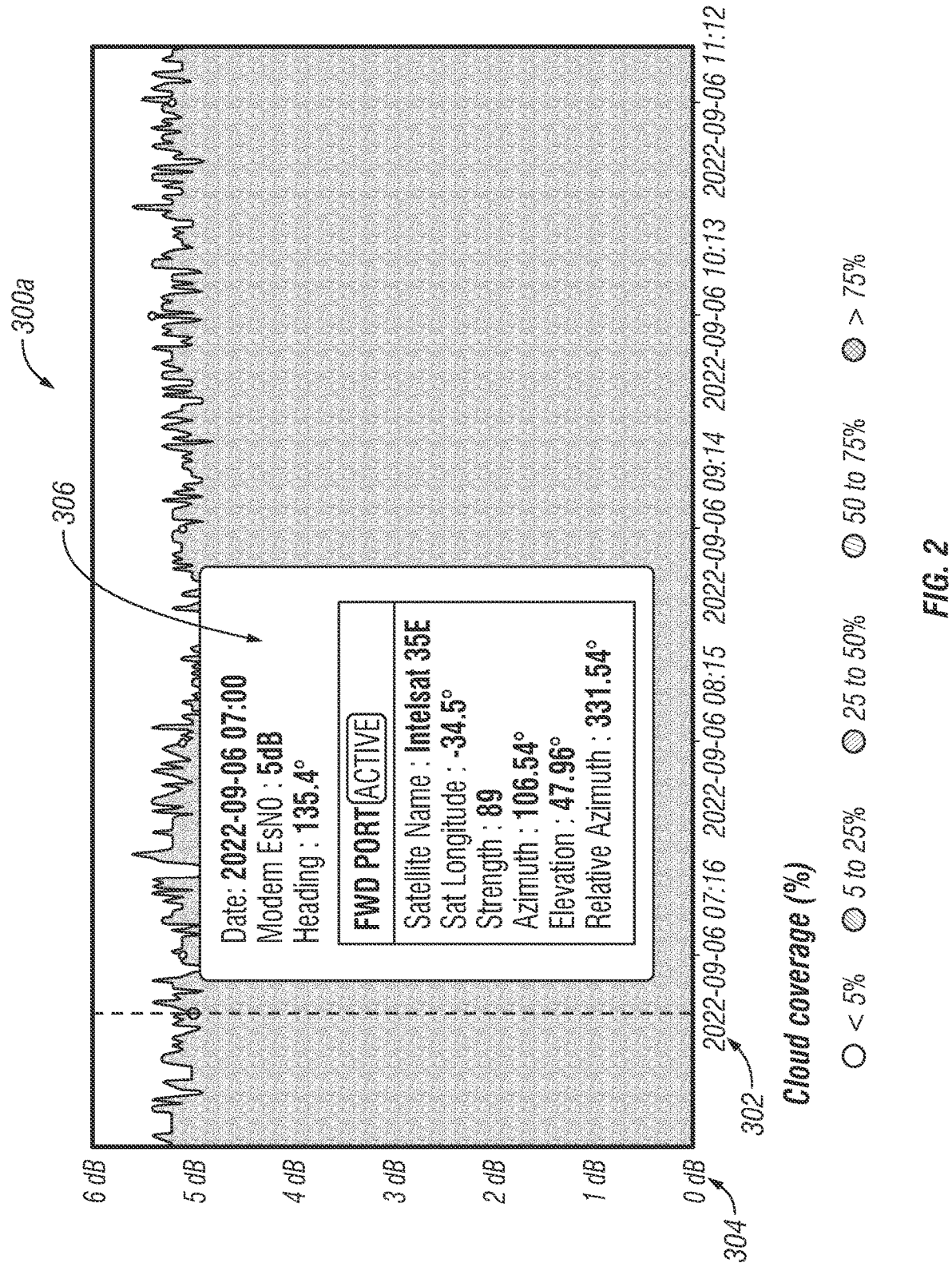
FIG. 2 illustrates RF visualization as part of a RF statistics system.

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

In one embodiment of the disclosure, a network communications system include a bandwidth system and a radio frequency statistic system. The bandwidth system may include an inspector module for receiving data packets from a data source, a bandwidth estimation module for dequeuing the data packets and marking the data packets as either high priority or low priority, a local modem for processing the data packets by dequeuing the data packets with the high priority data packets being dequeued at a higher ratio than the low priority data packets, a remote modem for receiving processed data pockets, a remote bandwidth estimation module for periodically transmitting feedback information from the remote modem to the local modem, wherein the feedback information includes the timing and number of data packets received, and a local bandwidth estimation module for receiving the feedback information transmitted to the local modem and determining packet loss due to congestion or burstiness. The radio frequency statistics system may include a radio frequency metrics module for collecting radio frequency metrics, a weather module for collecting weather metrics, and a visualization module for selectively displaying radio frequency metrics and weather metrics on an output device.

In further embodiments of a network communications system, the system may include an operations module in communication with the bandwidth system, the radio frequency system, and the data source, the operations module operable to analyze the radio frequency metrics, the weather metrics, and the feedback information, determine data packet loss due to radio frequency interference, and adjust radio frequency equipment at the data source. The radio frequency equipment may include a satellite, the processed data packets may be transmitted to the remote modem by the satellite, and the radio frequency metrics include antenna blockage information for the satellite. The radio frequency equipment may include a plurality of satellites, and the operations module may be operable to adjust the position of each of the plurality of satellites, where the local bandwidth estimation module is operable to determine which of the plurality of satellites is active. The data source may be a local area network on a mobile vessel. The remote modem and the remote bandwidth estimation module may be provided at a stationary location. The higher ratio may be 9:1. The timing of the feedback information may include a measure of latency build up information in a queue for the low priority data packets, and the local bandwidth estimation module may operate to reduce a packet transmission rate in response to an increase in the measure of latency. The timing of the feedback information may include a measure of latency build up information in a queue for the high priority data packets. The processed data packets may be transmitted to the remote modem by one of a plurality of satellites, and the radio frequency metrics may include antenna blockage information for each of the plurality of satellites.

Another embodiment of the disclosure is a method for estimating bandwidth and controlling packet rate using at least two queues. The method may include receiving data packets from a source, categorizing the data packets into traffic class queues, dequeuing the data packets, processing the data packets, receiving the processed data packets and forwarding the processed data packets to a remote bandwidth estimation module, and at the remote bandwidth estimation module, receiving the processed data packets and periodically transmitting feedback information. The processing may occur at a local bandwidth estimation module, and the dequeuing may include marking the data packets as high priority packets or low priority packets. The processing data packets may be at a local modem, and the processing may be by dequeuing the high priority data packets and the low priority data packets, the high priority data packets being dequeued at a higher ratio than the low priority data packets, wherein the modem transmits the processed packets to a remote location through a communications channel. Processed data packets may be received at a remote modem, which may also forward the processed data packets to a remote bandwidth estimation module. Receiving processed data packets and periodically transmitting feedback information may be at the remote bandwidth estimation module, and may include transmitting feedback information back to a local bandwidth estimation module via high priority and low priority queues through the remote modem, communications channel and local modem, where the feedback information includes timing and a number of data packets received. Receiving feedback information may occur at the local bandwidth estimation module, and may include determining data packet loss and jitter based on the feedback information, and increasing, decreasing or making no changes to packet rate for packets to be sent to the remote modem based on the packet loss and jitter. At the local bandwidth estimation module, the method may also include reducing the packet rate when there is packet rate when there is packet loss in either the low priority queue or the high priority queue and there is no latency build up in either queue. Determining packet loss may include determining packet loss for the high priority queue and the low priority queue, and wherein the local bandwidth estimation module decreases the packet rate for packets to be sent to the remote modem when the packet loss for the high priority queue is less than the packet loss for the low priority queue.

In further embodiments of the method, the communications channel may be a satellite communications channel, and the data source is a local area network on a mobile vessel One inventive aspect of embodiments of the disclosed bandwidth system 100 is the prioritization of data traffic in a communication network. The bandwidth system 100 disclosed herein can estimate the bandwidth on each channel between the Hub and Spoke in a communication network. A channel may be defined as a path between the Hub and Spoke over a specified WAN Circuit (i.e., WiFi, Starlink, 5G, SCPC, TDMA, etc.). A channel may use User Datagram Protocol (UDP) as a transport with the system of the present invention controlling the data rate. A channel, for example, may carry hundreds or thousands of individual user connections (i.e., flows).

To facilitate the prioritization of network traffic, one component of the bandwidth system may include categorizing traffic into Traffic Classes. These Traffic Classes may be used to prioritize traffic within the system. Most modems have multiple queues that can be used to prioritize traffic.

In one embodiment, the disclosed bandwidth system categorizes traffic into two classes: high priority ("HP") and low priority ("LP"). The system can take advantage of both queues (high priority and low priority) to create a novel approach to estimate bandwidth. The term "high priority" is used interchangeably with the term "foreground" ("FG") when referring to subchannels or queues and the term "low priority" is used interchangeably with the term "background" ("BG") when referring to subchannels or queues.

Modems can typically differentiate traffic based on IP/port and/or differentiated services code point (DSCP) markings within the IP header. Another component of the present system is the use of DSCP markings to split the channel (the main communication channel between two bandwidth estimators and having two subchannels—one for each queue in accordance with one embodiment) into a first Foreground/high priority sub-channel and second Background/low priority sub-channel. The channel itself still uses one UDP flow between Hub and Spoke (i.e., one source IP, source port, destination IP, and destination port, collectively known as a quad or flow).

The single UDP flow can be achieved despite splitting the channel into subchannels through use of DSCP marking and the IP header type of service (TOS). The FG sub-channel has a unique DSCP marking that the modem assigns to a specific queue and the BG sub-channel uses a different DSCP marking that is assigned to a second queue. The system of the present invention marks the traffic, and the modem sees the mark and directs the packet to the matching queue.

The queue associated with the FG traffic should have a much higher priority than the queue associated with the BG traffic. For instance, the FG queue may be weighted at 100 while the BG queue may be weighted at 1. This means the FG queue is processed 100 times more often than the BG queue. Different modems have different ways to prioritize. What is important is that the FG queue be processed much more often than the BG queue. In one embodiment, the FG queue processing to the BG queue processing follows a 9:1 ratio or more. In terms of measuring packet loss, packet loss may be measured as a percentage of packets sent versus packets received; the goal, however, is to avoid it altogether, which may be achievable by implementing the disclosed embodiments, specifically, by detecting congestion on a low priority queue first.

One advantage of the inventive embodiments is that the BG/LP queue can recognize congestion before the FG/HP queue because the BG/LP queue is being served less often. This allows embodiments of the system to use the Traffic Class (TC) priorities, along with other TC meta-data, to send high priority loss sensitive traffic over the FG sub-channel while sending lower priority and potentially less loss sensitive data over the BG sub-channel. Examples of FG/high priority traffic may include web traffic and videoconference or teleconference calls. Examples of BG/low priority traffic may include software updates and file transfers. Embodiments of the disclosed system thus have the ability to use the BG sub-channel to drive the bandwidth estimation algorithm without affecting traffic on the FG sub-channel.

Another aspect of the disclosed system is to estimate bandwidth. Bandwidth estimation algorithms typically require a feedback mechanism within the protocol that allows for the detection of latency and packet loss. Embodiments of the disclosed system may implement a channel protocol that provides such a mechanism.

An estimation algorithm using two queues (2Q) may be implemented in an embodiment of the disclosed system, and the estimation algorithm may employ a method including the following steps. First, detect any latency build-up in the BG sub-channel. This may be an indication that the BG queue within the modem is starting to build up and packet loss due to congestion is imminent. In this case, the bandwidth estimation module reduces the channel's bandwidth estimation (i.e., lowers the bandwidth or reduces the packet rate). If the build-up continues, the bandwidth estimation module may reduce the bandwidth/packet rate even more. Second, identify packet loss seen on the BG sub-channel that is not seen on the FG sub-channel. This indicates packet loss is imminent on the FG sub-channel and the estimation (i.e., channel bandwidth/packet rate) needs to be reduced. Third, if there is no packet loss on either sub-channel and the BG latency is steady (i.e., not building up), then the bandwidth estimation module increases the bandwidth estimation. These steps may allow the system to detect congestion and avoid or minimize FG packet loss. The estimation algorithm is also able to detect non-congestion related packet loss and the 2Q approach enhances that ability as well. This 2Q approach can thus be used to distinguish congestive packet loss from non-congestive packet loss (for example, RFI).

Non-congestive packet loss, such as packet loss due to RFI, should affect both queues equally. Embodiments of the system may measure the constant or periodic RFI loss and factor it out of the congestion algorithm. For example, if there is 5% packet loss due to RFI, both the LP and HP queues will experience the same 5% packet loss. The BW estimation module may use this information to deduce that that the 5% packet loss is not due to congestion, and that lowering the packet rate will not lower the packet loss percentage. Therefore, the BW estimation module (running the BW estimation algorithm) can factor out that 5% loss. This allows the BW estimation module to detect congestive packet loss on top of the non-congestive packet loss. If the BG Queue is seeing 6% loss, for example, and the FG queue is seeing 5% loss, then that extra 1% loss is due to congestion and the BW estimation module will lower the packet rate with the goal of removing that extra 1% packet loss due to congestion.

FIG. 1 shows an embodiment of the bandwidth system 100. The deep packet inspector module 101 may receive ingress packets from a LAN and divide the traffic into classes or traffic class queues (some HP some LP). The local bandwidth estimation module 103 implements a process that dequeues the packet, marks the packet as HP or LP (via DSCP marking), and sends the packet to the local modem 105 (based on available bandwidth). The local bandwidth estimation module 103 also uses feedback from a remote bandwidth (BW) estimation module 109 to determine latency, jitter and packet loss for HP and LP queues.

Modem 105 dequeues the HP packets received from the local BW estimation module 103 in a 9:1 ratio to LP queue and sends the packets/queues to a remote BW estimation module 109 via a satellite in accordance with one implementation. Since LP queue is processed far less often, it will likely see or experience congestion before the HP queue.

In one embodiment, the functionality of the inspector module 101 and the local BW estimator may be combined in a single hardware or software module (referred herein as a Traffic Manager). Thus, under a scenario where a Traffic Manager is used, there are two devices at each end of the system of the present invention: Traffic Manager and Modem. For incoming packets, each device has queues. As should be recognized by a person of ordinary skill in the art, any networking gear has queues to hold incoming packets until the device can send them. The Traffic Manager takes in a packet from the local LAN, determines what Traffic Class it goes to and places the packet on that Traffic Class Queue. Some of those queues are HP and some are LP. HP/LP determines the DSCP marking sent to the modem. The Traffic Manager then dequeues packets from the appropriate queue and sends the packet to the modem (second device). The Traffic Manager sends the packets as determined by the BW estimation algorithm based on available bandwidth. The modem then receives the marked packet and places it on either the HP or LP queue. When there is bandwidth available, the modem then dequeues the packet and sends it to the satellite.

Once the packet gets past the FG/BG queue of the egress modem 105 priorities no longer matter. The priority is only needed at the egress modem 105 to separate the traffic into two queues. The remote BW estimation module 109 will see the DSCP marking and acknowledge the packet based on that marking, but the marking is not used in any other way at the remote location.

The remote modem 107 receives the data queues from the satellite and sends the packets to the remote BW estimation module 109. The remote BW estimation module 109 receives data packets and sends feedback messages to the local BW estimation module 103 that contain timing and packet loss information (broken down by HP and LP), specifically, the number of packets it has received. Feedback is sent periodically via the HP and LP queues sent to the local BW estimation module 103 (in the return direction).

The feedback is shown by the dotted lines in FIG. 1. This feedback may be used to determine packet loss and measure latency and jitter. For example, once the local BW estimation module receives information about how many packets were received by the remote BW estimation module. Since the local BW estimation module knows how many packets it has sent, it can use data from the feedback message to determine how many were lost. Based on those measurements, the local BW estimation module 103 may increase, decrease or make no change to the outgoing (in the direction of the remote) packet rate.

Note that the exact same process is implemented in the reverse direction. For instance, the illustrated embodiment shown in FIG. 1 implies the direction of Spoke to Hub for data packets and Hub to Spoke for feedback messages. For data packets from the Hub to the Spoke, just change the ingress packets to module 101 would be input "From WAN" (i.e., from the Hub) as opposed "from LAN" as indicated in FIG. 1, and the egress packets from remote BW estimation module 109 would be output "to LAN" (i.e., to Spoke) as opposed to "to WAN" as indicated in FIG. 1. Bandwidth estimation in the Spoke to Hub direction is completely independent from the bandwidth estimation in the Hub to Spoke direction. The directions are likely asymmetrical (maybe 50 Mbps in one direction and 20 in the other, for example).

Referring now to FIGS. 2-15, embodiments of spatiotemporal RF visualizations 300 are shown as part of a broader RF statistics system 200. Illustrated RF visualizations include overlays of environmental conditions such as cloud cover 300a, air temperature 300b, and precipitation 300c as well as overlays of vehicle or ship spatial location 300d and RF equipment 300e operation data.

Disclosed embodiments of RF visualizations 300 can group operating conditions of RF equipment, geo-spatial location of the vessel, and environmental or weather conditions into logical entities while presenting various metrics in a concise, streamlined manner thus allowing an IT officer to correlate the metrics efficiently in order to trouble shoot, analyze, or predict failure or suboptimal performance of a wireless communications network. Grouping the RF equipment as a logical entity means that one can group the equipment together for monitoring purposes to treat them as a single system. So instead of looking at the performance of a single antenna and then see that particular antenna fail when the visualization switches to another antenna, the communications system as a whole may monitored so that transition appears as seamless.

Each RF visualization may include a time stamp 302 along the "X" axis and a noise pollution measurement 304 along the "Y" axis. In the illustrated embodiment, EsNO is used as the noise pollution measurement, while other well understood measurements such as C, N, C/N, and EbNO may be utilized. Optionally an environmental visualization 300a, 300b, 300c may be overlayed on tracked data points showing noise pollution at a given time. An operator may select or click on a given data point in order to toggle a pop-up display 306 of additional data associated with the selected time. Additional data included in the pop-up display may include geo-spatial data and RF equipment information. Certain communications networks may include multiple data transmitters, such as LAN local satellites, and display 306 may provide information regarding each transmitter. For example, in the illustrative embodiment of FIGS. 3 and 4, the user has selected a first data point 310 corresponding to a first time stamp and later a second data point 312 corresponding to the first stamp. The operator may then observe the operating status of each satellite, which for data points of the illustrated embodiment a middle position satellite is active while an aft positioned satellite is inactive. The operator may then quickly and efficiently note the difference in geo-spatial positioning of the vessel as well as the data transfer strength and positioning of each satellite during this time elapse. It should be further noted that embodiments of the communications network disclosed herein recognized the improved strength of the aft satellite relative to the middle satellite and a change was initiated between which satellite was active for data transfer. Geo-spatial visualizations 300*d* may also be toggled to show the positioning change of the vessel during the period selected by the operator.

Figure 9:
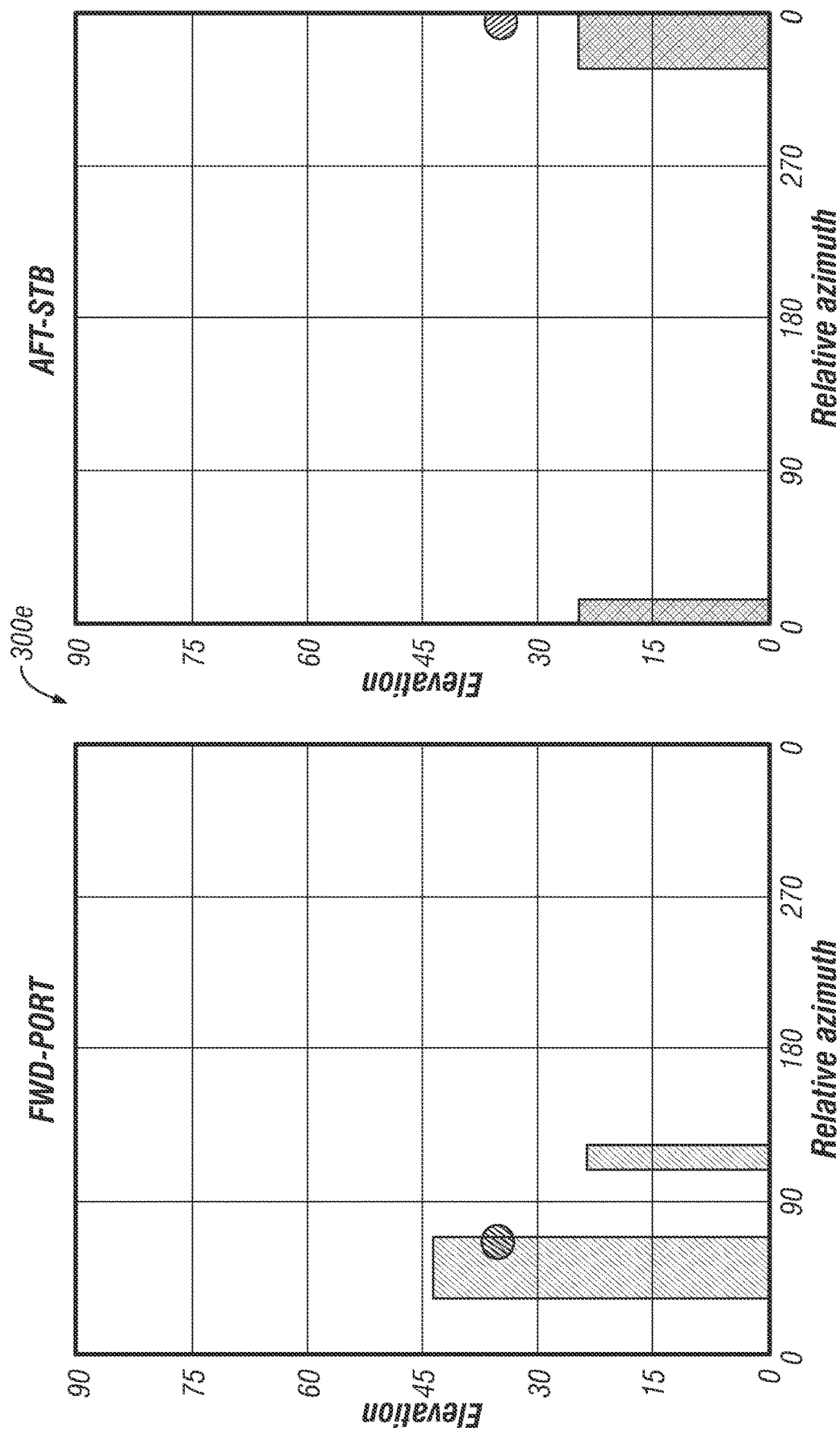
FIG. 9 illustrates an Antenna Blockage Zone Chart.
Figure 10:
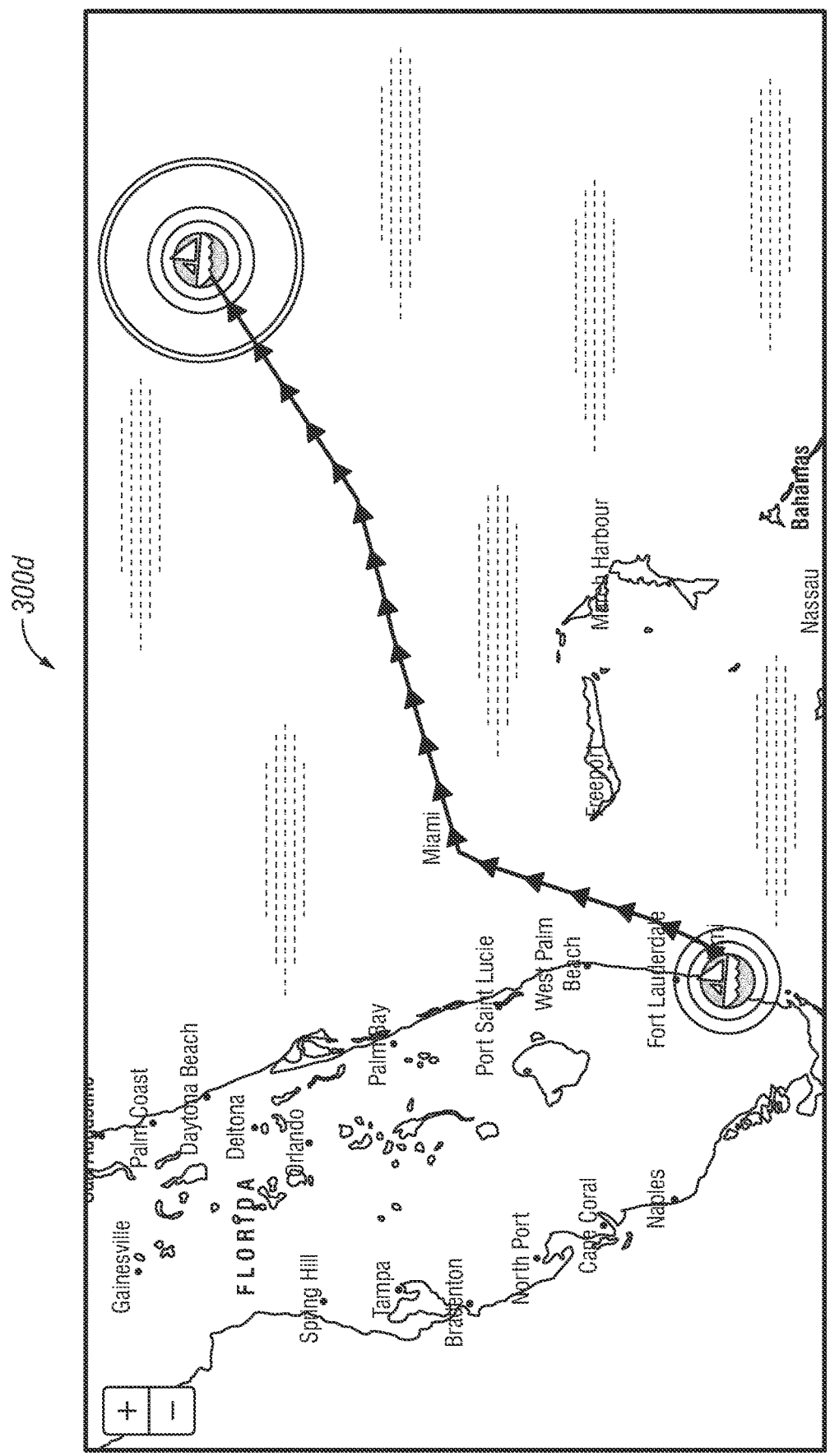
FIG. 10 illustrates a Geo Location Visualization showing the path of a ship for a selected time period.
Figure 11:
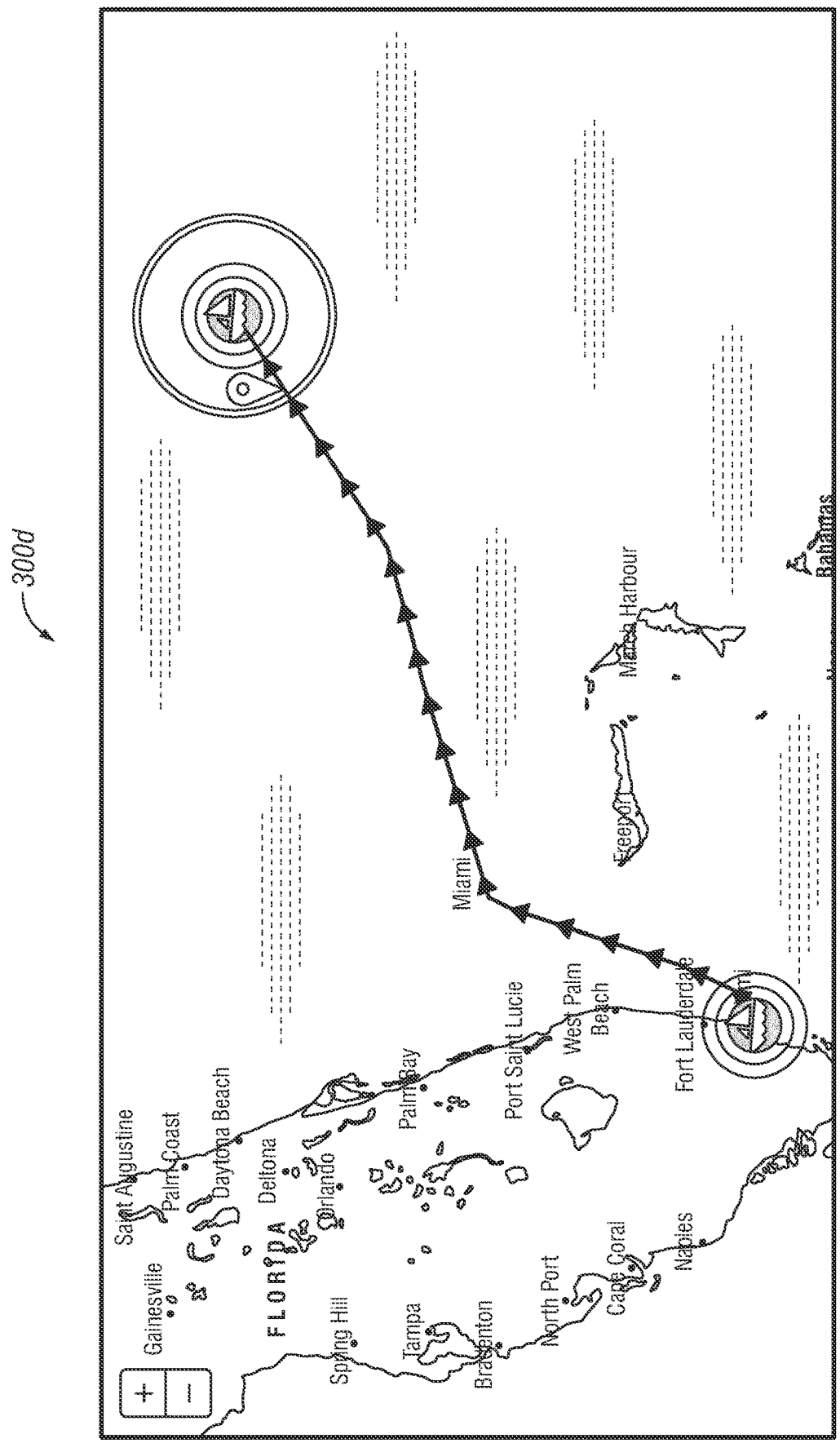
FIG. 11 illustrates a Geo Location Visualization showing a position of a ship at a selected data point.
Figure 14:
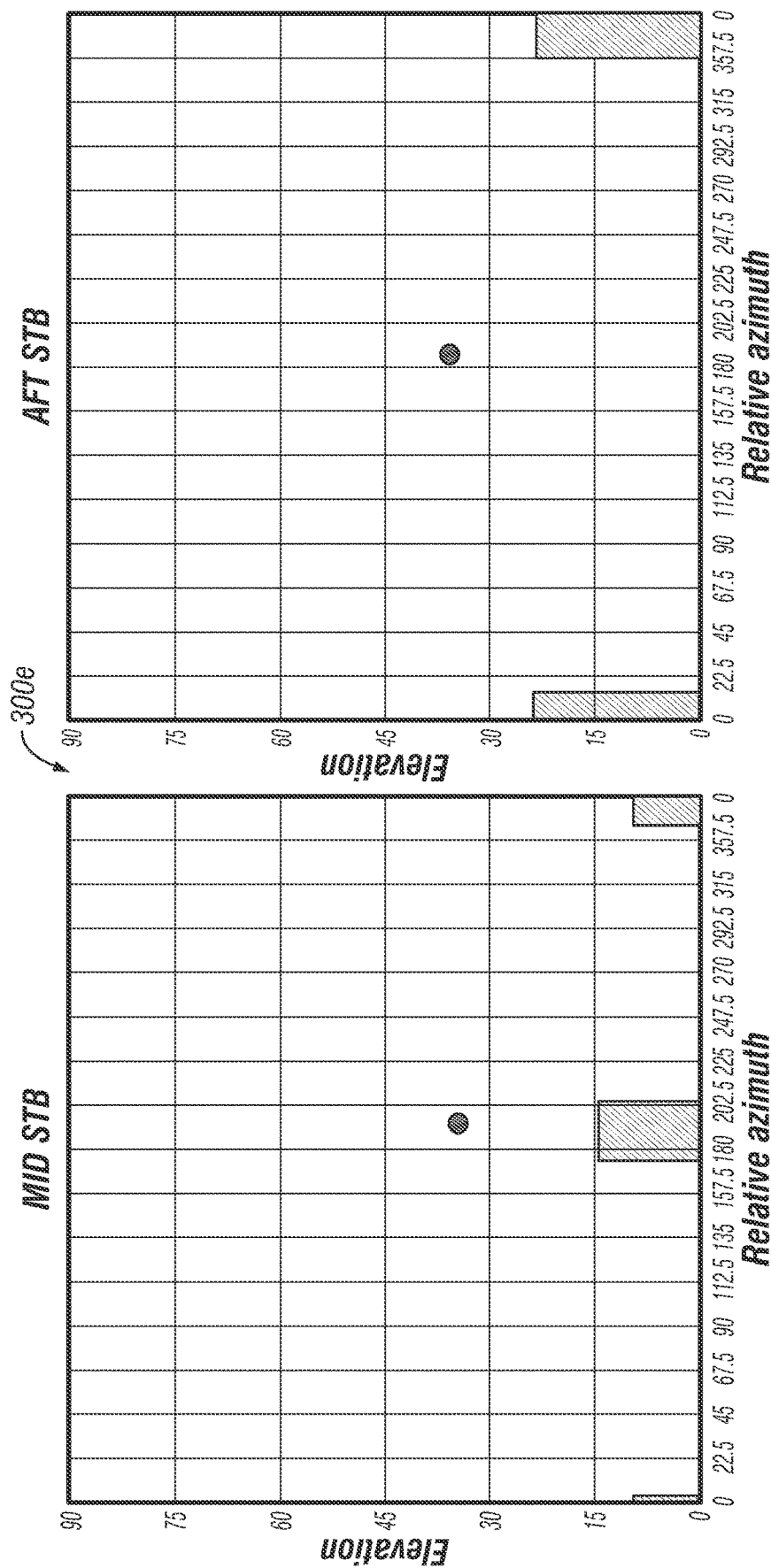

FIGS. 9 and 14 illustrate antenna blockage zone charts as part of a RF equipment visualization 300*e*. The RF statistic system 200 operator has the ability to view antenna blockage information for every data point. For example, if an operator hovers over a point in time in the chart the operator will see the blockage zone chart updates to show where the antenna was pointing at that time. The blockage zone chart is a preset representation of areas on the vessel where there will be a structure blocking the satellite signal. This enables the operator to correlate the antenna blockage zone with overall network communication system performance for current and historical data. The antenna blockage zone can be configured manually at each antenna level. This means that an operator can load the blockage chart for each of vessel's antennas into the system and the system will be able to show how that antenna is pointing its beam relative to those blockage zones. A two-antenna system is illustrated. In the embodiment of FIG. 9, the "FWD-PORT" antenna is within the blockage zone as indicted by the circle whereas the "AFT-STB" antenna is not within the blockage zone as shown by the different colored circle. The vertical bars on both graphs show the defined blockage zones for the respective antennas.

Figure 12:
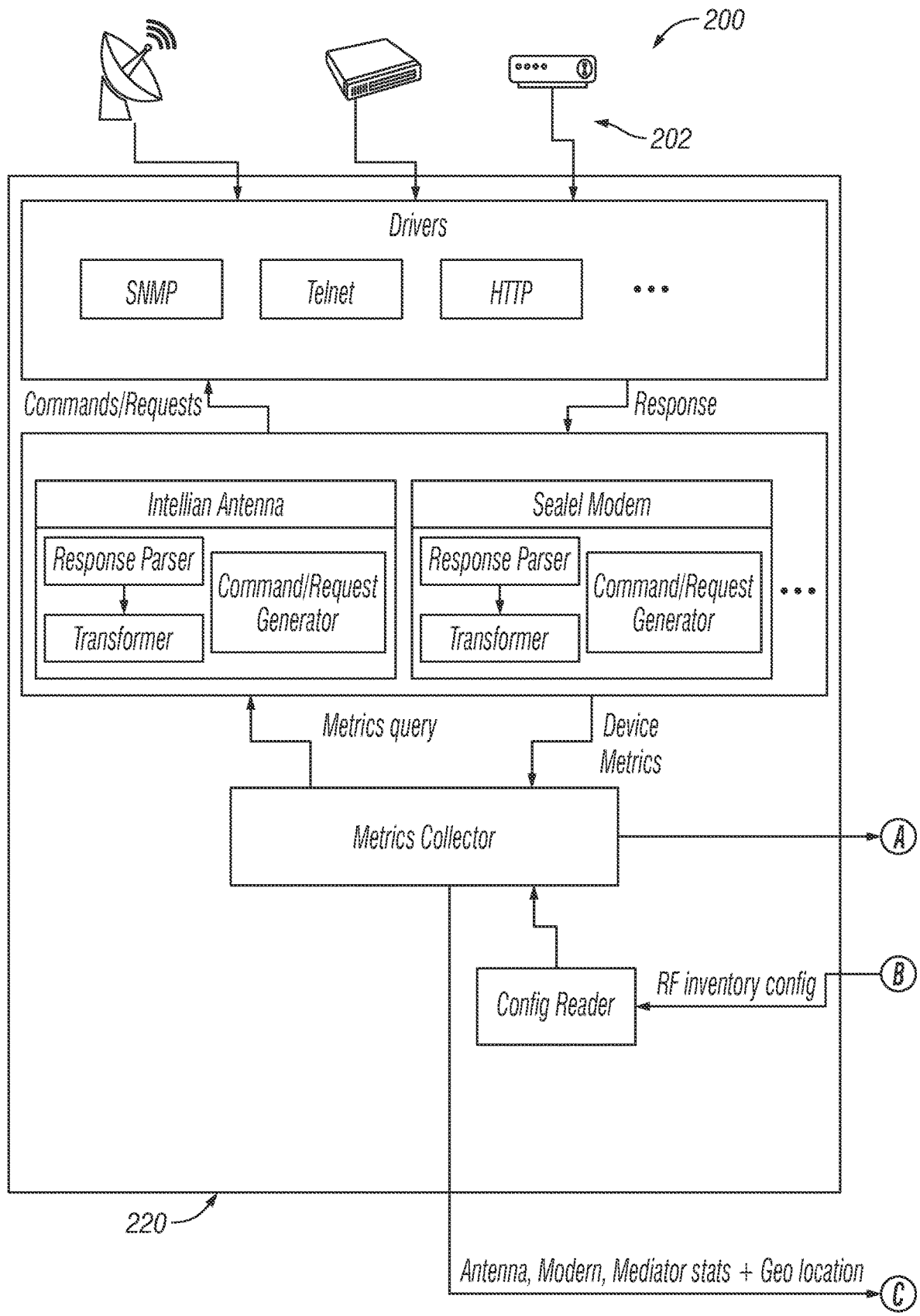
FIG. 12 illustrates a system flow diagram of the RF visualization in accordance with one embodiment.
Figure 12:
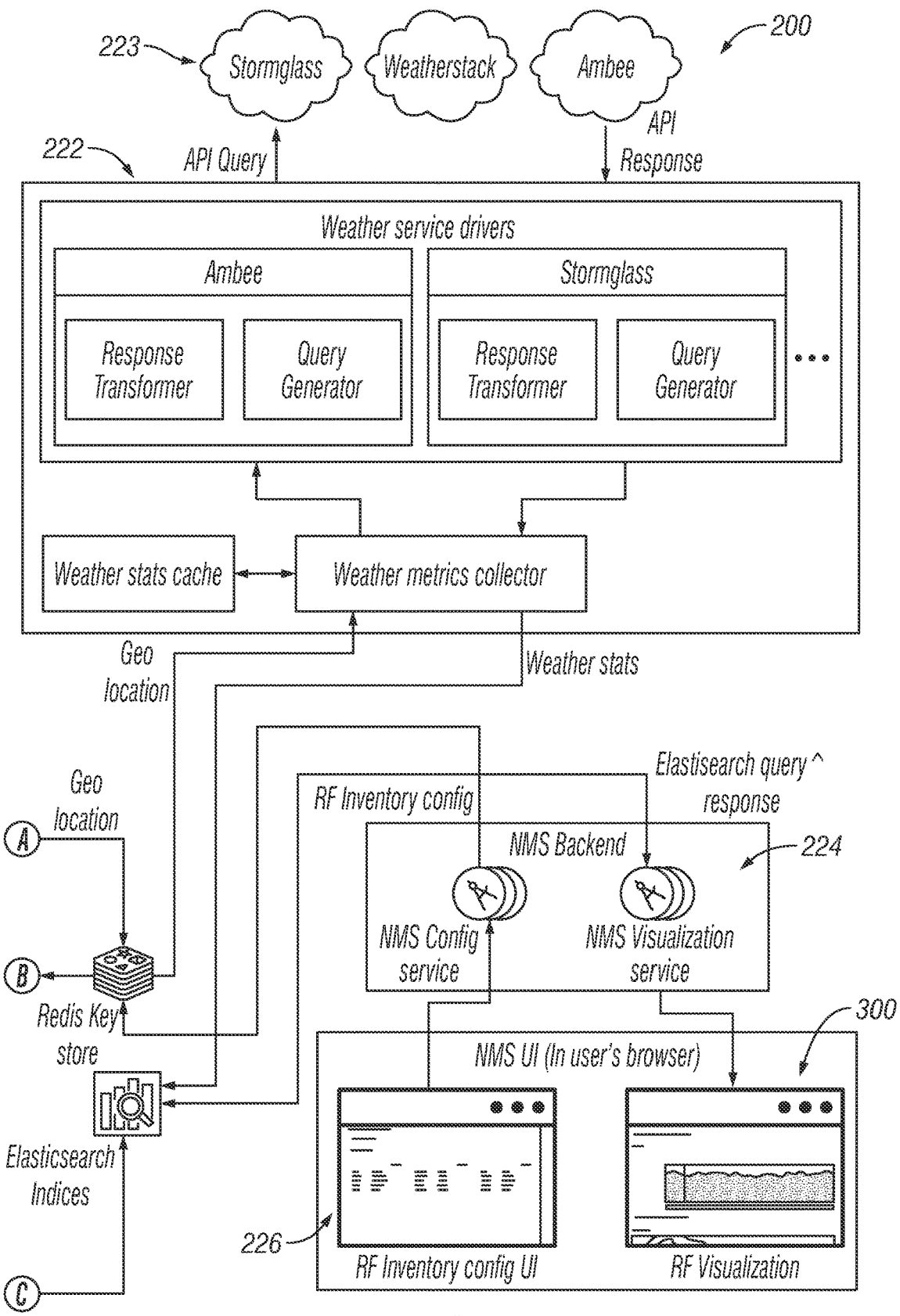
Figure 13:
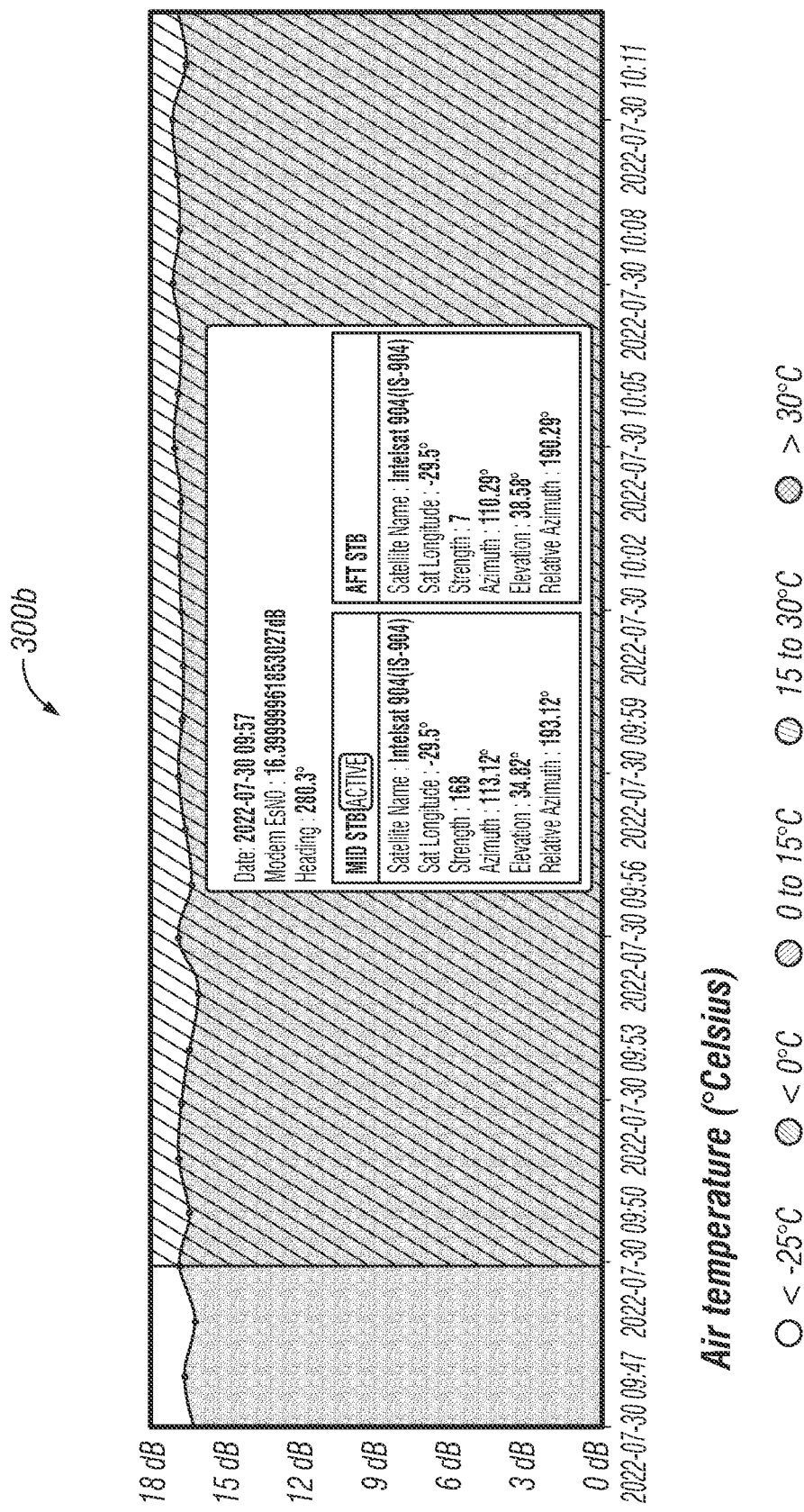

An RF statistics system 200, as shown for example in FIG. 12, may be utilized for the collection of data from a communications network in order to generate the RF visualization 300 embodiments described herein. Data transmitters 202 such as a satellite may transmit and receive data collected from a LAN to an RF metrics module 220. RF metrics module may include the shown and described components for acquiring the aforementioned metrics used for generating RF visualizations, namely locally detected weather or environment conditions, RF equipment data, and geo-spatial data of the subject vessel. Concurrently, a weather module 222 may independently collect weather metrics, such as environmental conditions in the vicinity or proximate the chartered course for the vehicle, from third-party sources 223. Weather metrics and RF metrics be then transmitted to a visualization module 224 resulting in output of the operator selected RF visualization 300. RF inventory 226 may also be maintained by the RF statistic systems in order to manage and associate different components of the system with the metrics to be displayed as part of the RF visualization.

Bandwidth system 100 and RF statistics system 200 may be in mutual communication with an operations module that could be operating at any point in the communications network, but in at least one embodiment is operating on remote modem 107. The operations module may be operable to automatically and in real-time distinguish data packet loss attributable to congestion, burstiness, or radio frequency interference. Congestion and burstiness can be readily confirmed from analyzing the feedback information in the bandwidth system 100, or by receiving already analyzed feedback information from local BW estimation 103. Data packet loss can be inferred by the data packet loss occurring unassociated by burstiness or congestion, and confirmed by comparing this information with the radio frequency metrics and weather metrics collected by RF statistic system 200.

Figure 3:
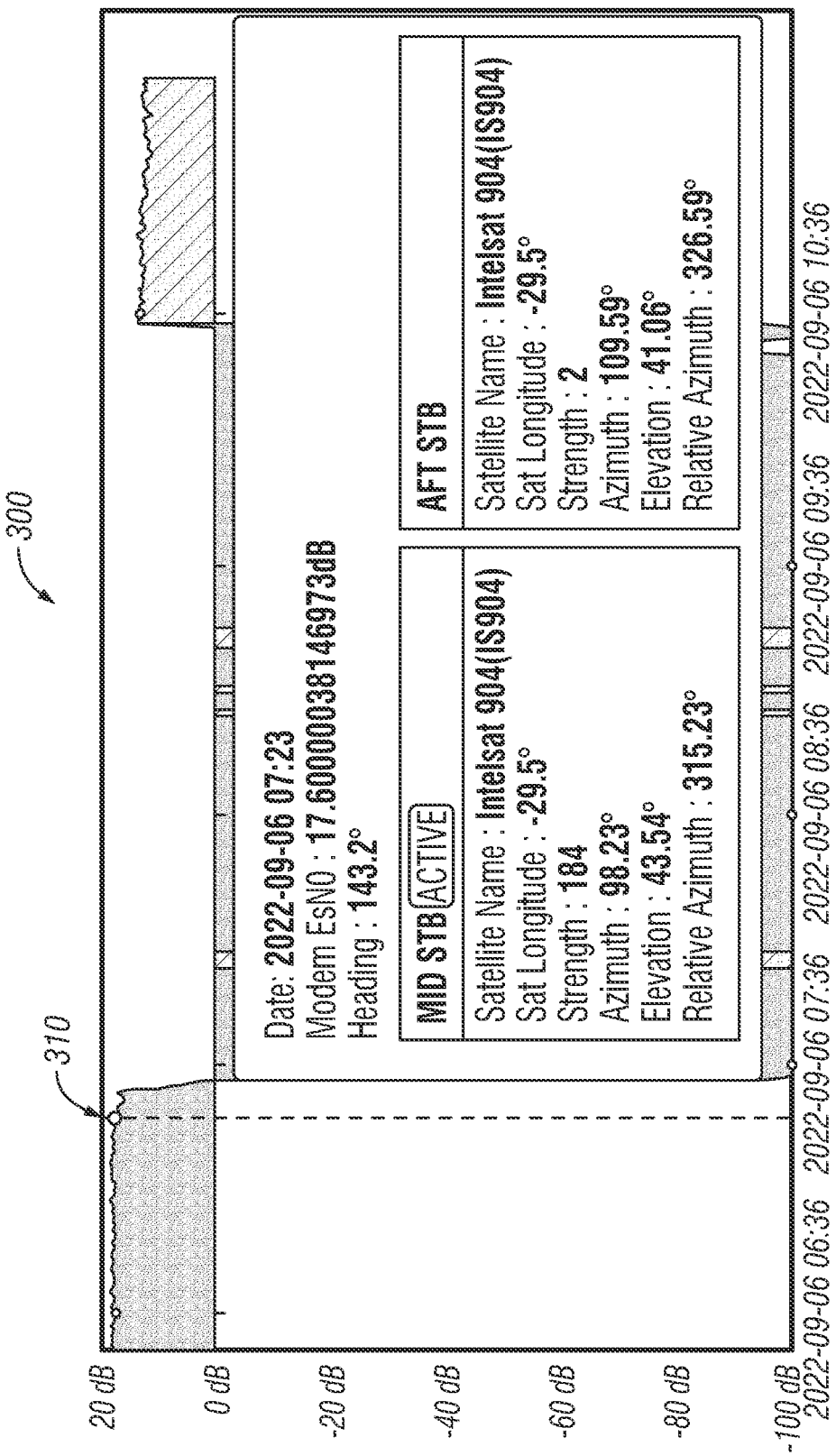
FIGS. 3 and 4 illustrate a user's view of a graphical user interface showing a switch from one antenna to the other.
Figure 4:
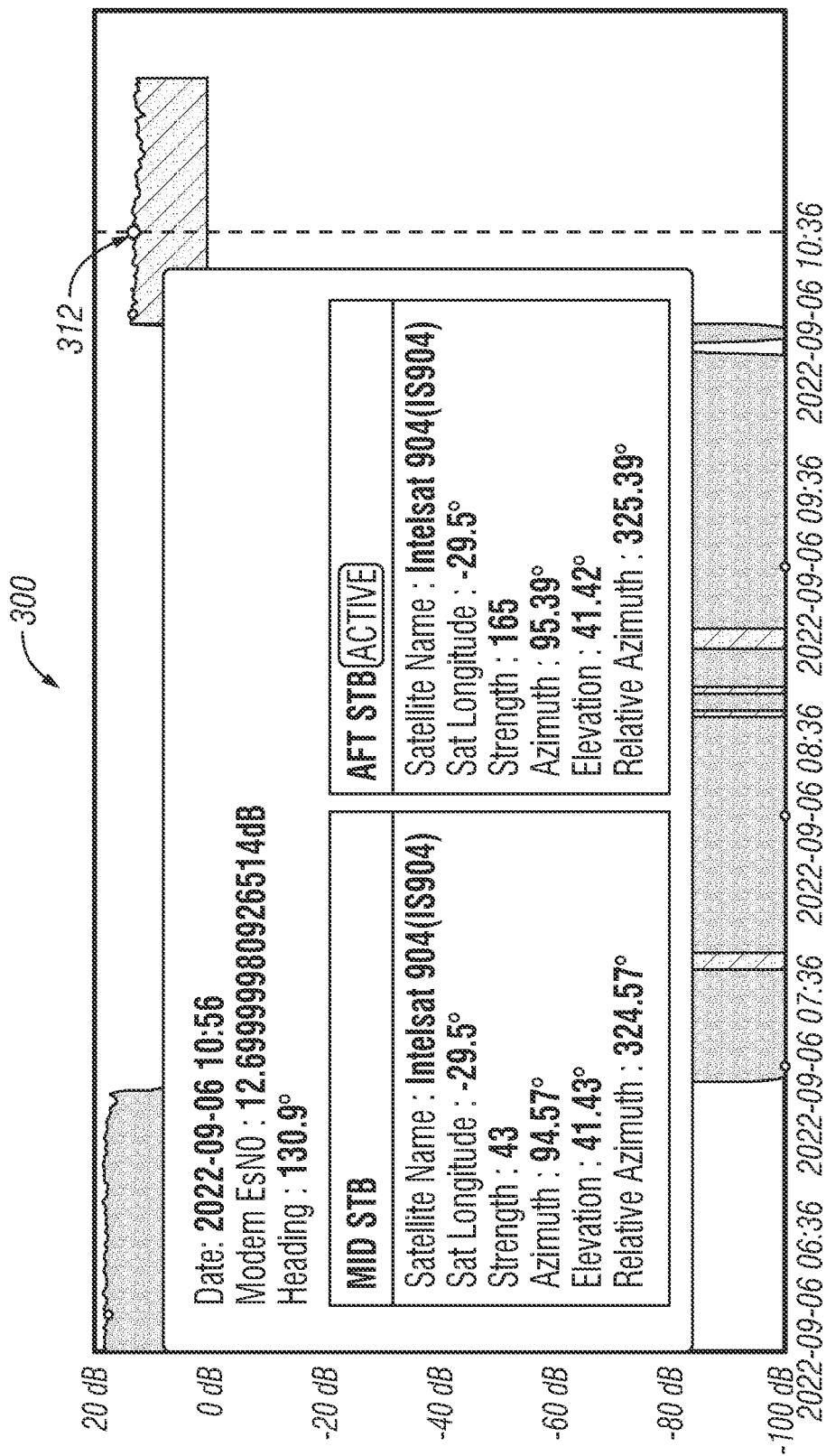
Figure 5:
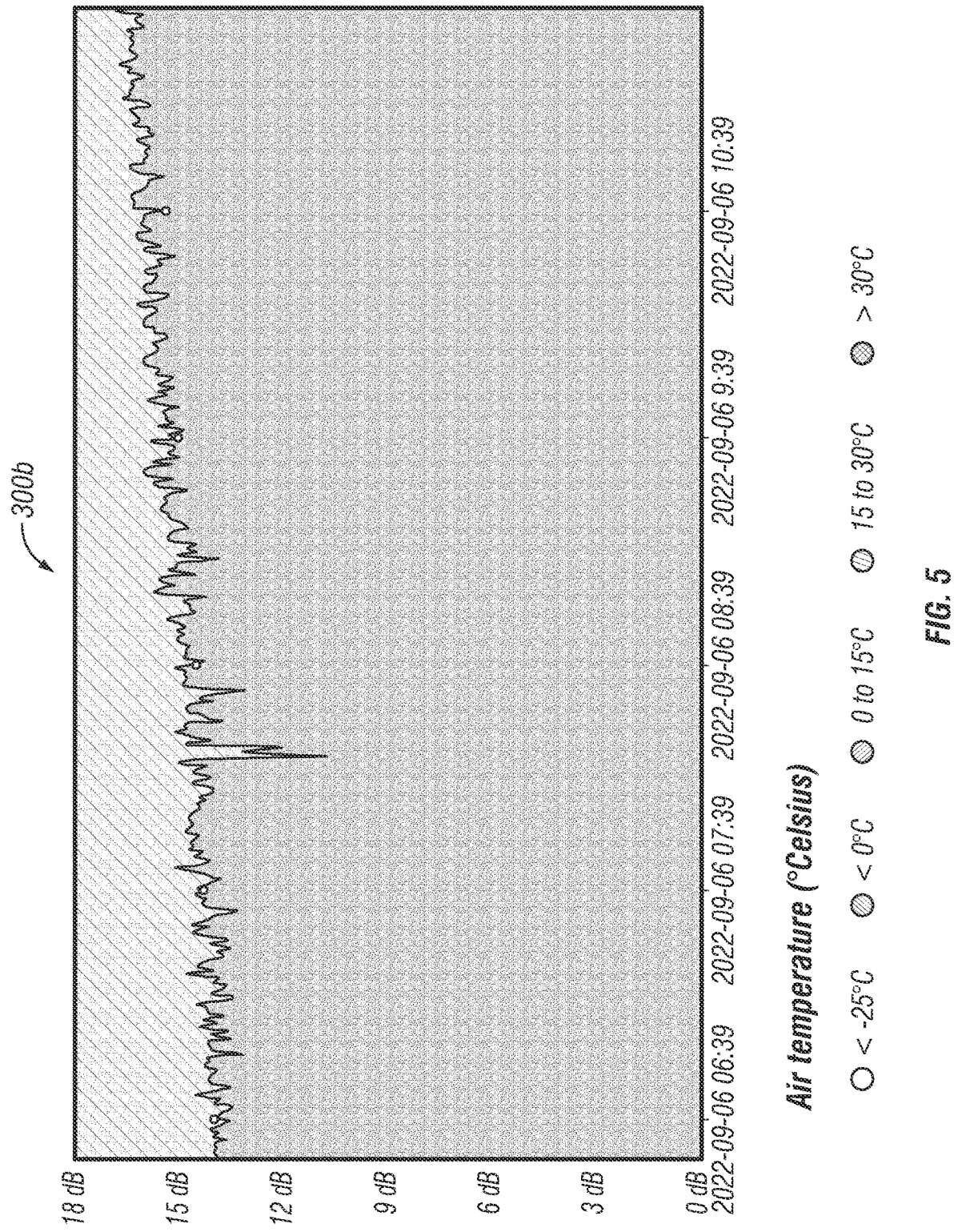
FIG. 5 illustrates the RF visualization showing an Air Temperature Overlay.
Figure 6:
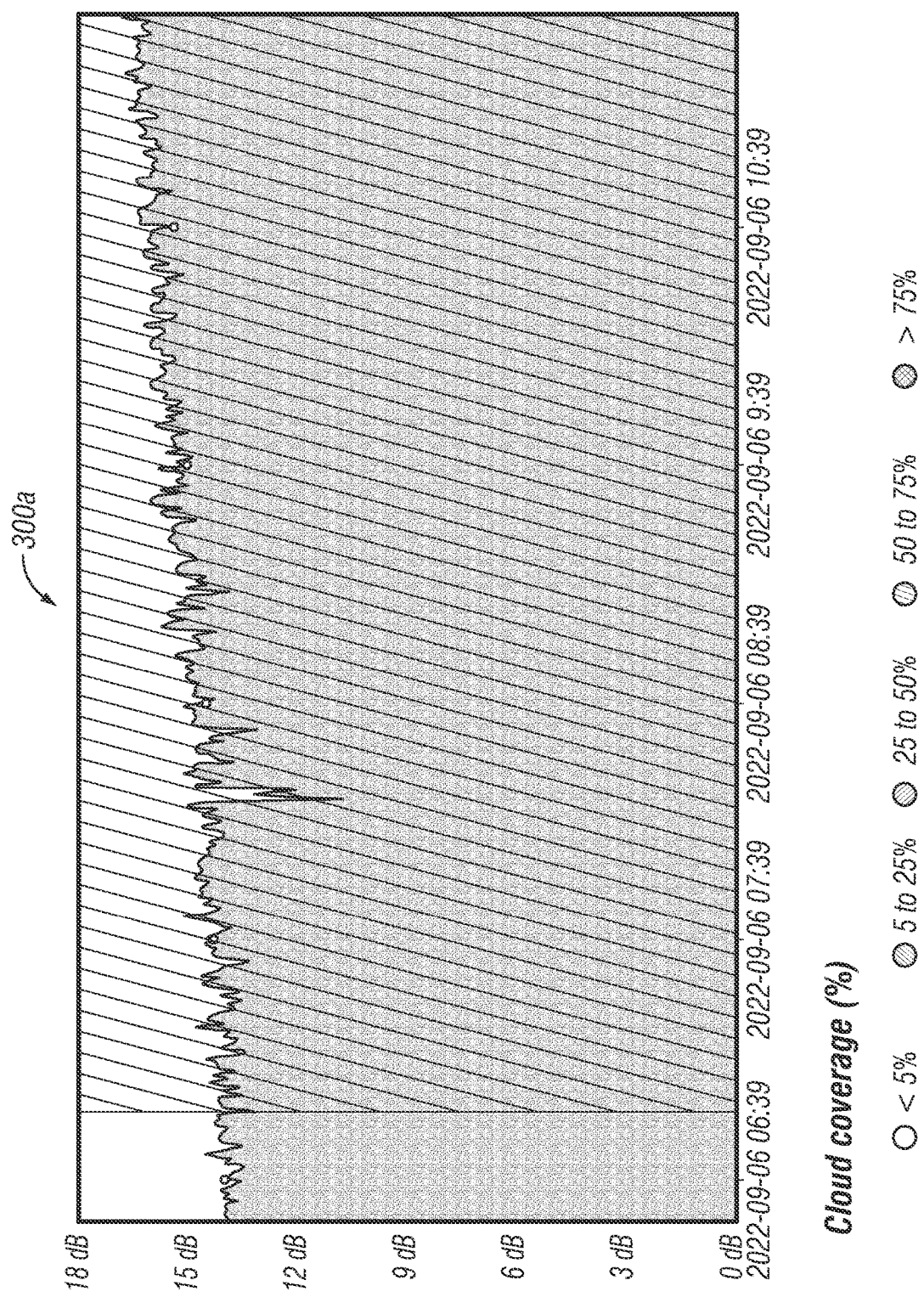
FIG. 6 illustrates the RF visualization showing a Cloud Coverage Overlay.
Figure 7:
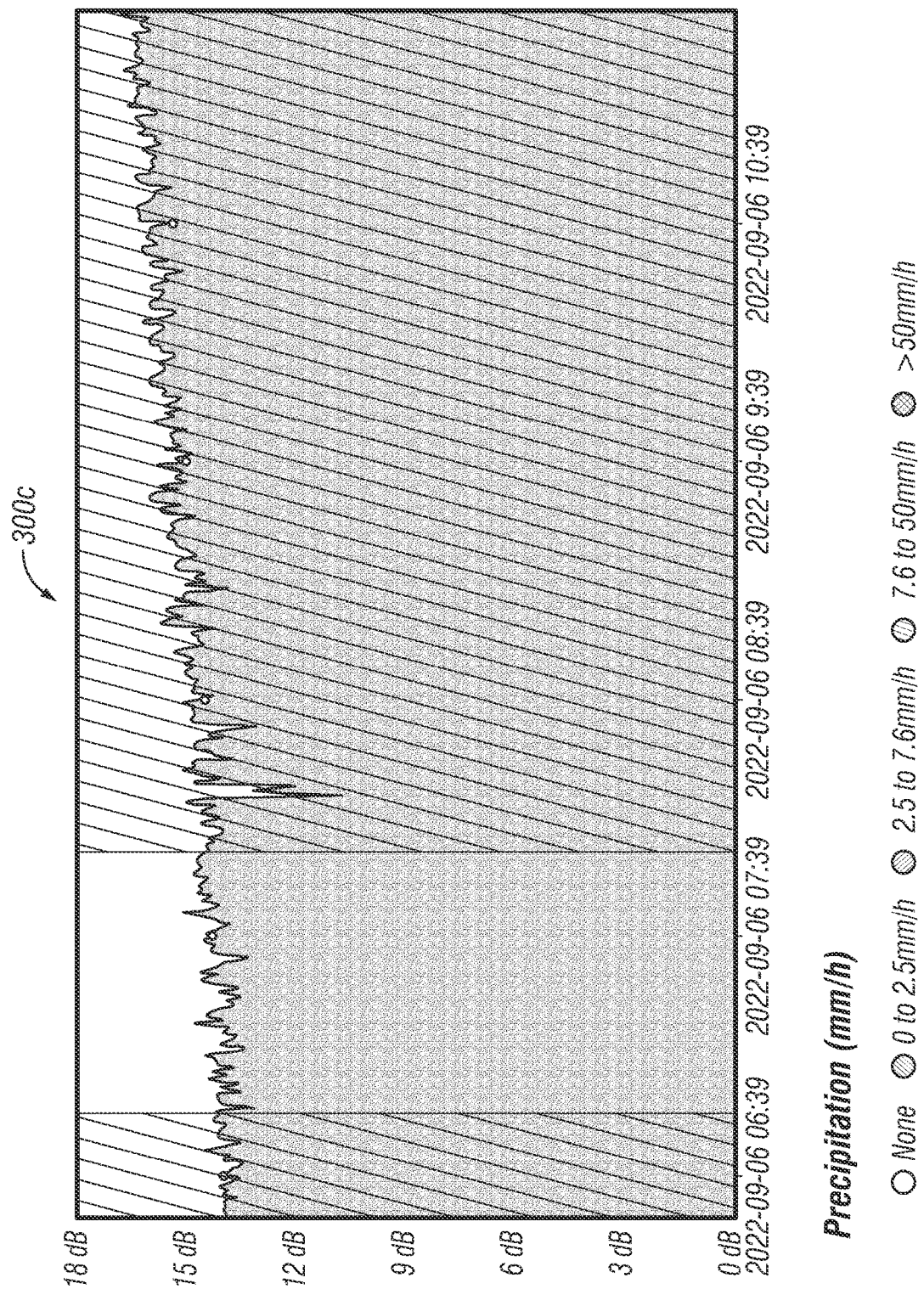
FIG. 7 illustrates the RF visualization system showing a Precipitation Overlay.
Figure 8:
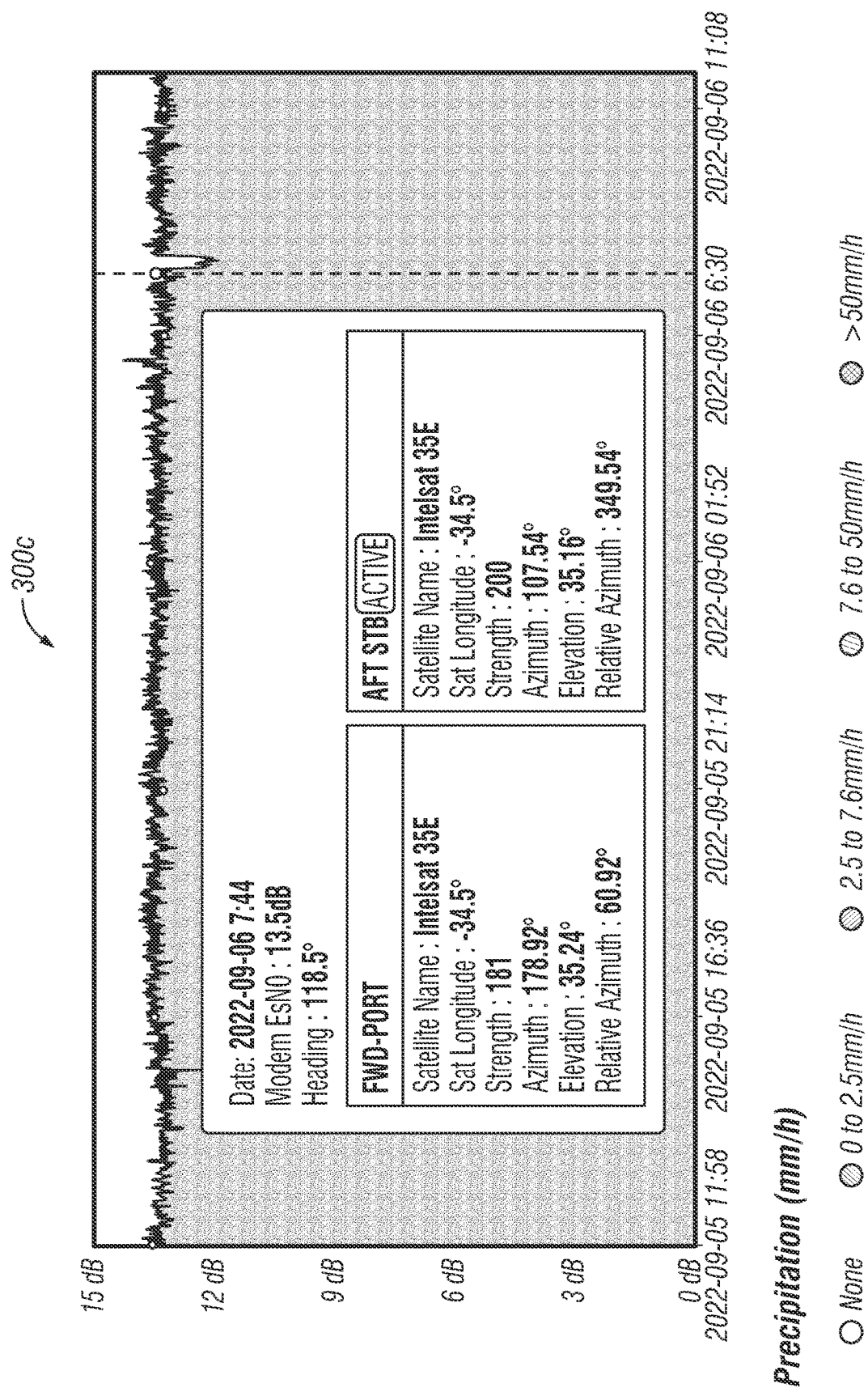
FIG. 8 illustrates another embodiment of the RF visualization showing a Precipitation Overlay.

In certain embodiments, an operator or IT officer of the system may manually review data packet loss sources and adjust RF equipment on the vessel, such as satellite activity status or satellite positioning. In other embodiments, this adjustment can be performed automatically and in real time by the disclosed systems. For example, the visualizations of FIGS. 3 and 4 show two data points just between an approximately three-hour period of significant noise pollution. Just before the period, the middle satellite was active and operating and operating at greater strength while just after the aft satellite was active and operating at a greater strength. In certain embodiments, both satellites could be active with the great strength satellite assigned HP data packets while the lower strength satellite is assigned LP data packets. Alternatively, all transmitted data packets from the LAN could transmit from a single satellite.

The LAN environments described herein are generally shown and described with respect to a large, ocean-going ship or vessel such as a yacht or cruise ship. However, it should be appreciated that these LAN environments are contemplated as any mobile environment in which local users desire access to a wireless communication network such as an airplane, train, or motor vehicle in addition to a ship. Moreover, while the concepts disclosed are particularly advantageous with mobile LAN environments, the system and methods described herein could be employed for use in stationary environments particularly those prone to packet loss due to RFI, such as structures or open-air areas situated in remote areas with a high frequency of inclement weather.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

What is claimed:
1. A network communications system comprising:
   a bandwidth system including
      an inspector module for receiving data packets from a data source,
      a bandwidth estimation module for dequeuing the data packets and marking the data packets as either high priority or low priority, a local modem for processing the data packets by dequeuing the data packets with the high priority data packets being dequeued at a higher ratio than the low priority data packets, a remote modem for receiving processed data pockets, a remote bandwidth estimation module for periodically transmitting feedback information from the remote modem to the local modem, wherein the feedback information includes the timing and number of data packets received, and a local bandwidth estimation module for receiving the feedback information transmitted to the local modem and determining packet loss due to congestion or burstiness; and a radio frequency statistics system including
a radio frequency metrics module for collecting radio frequency metrics,
a weather module for collecting weather metrics, and
a visualization module for selectively displaying radio frequency metrics and weather metrics on an output device.

2. The network communications system of claim 1 further comprising an operations module in communication with the bandwidth system, the radio frequency system, and the data source, the operations module operable to
analyze the radio frequency metrics, the weather metrics, and the feedback information,
determine data packet loss due to radio frequency interference, and
adjust radio frequency equipment at the data source.

3. The network communication system of claim 2, wherein the radio frequency equipment includes a plurality of satellites,
wherein the processed data packets are transmitted to the remote modem by one of the plurality of satellites, and
wherein the radio frequency metrics include antenna blockage information for each of the plurality of satellites.

4. The network communications system of claim 3, wherein the operations module is operable to adjust the position of each of the plurality of satellites, and
wherein the local bandwidth estimation module is operable to determine which of the plurality of satellites is active.

5. The network communications system of claim 2, wherein the radio frequency equipment includes a satellite,
wherein the processed data packets are transmitted to the remote modem by the satellite, and
wherein the radio frequency metrics include antenna blockage information for the satellite.

6. The network communications system of claim 1, wherein the data source is a local area network on a mobile vessel.

7. The network communications system of claim 6, wherein the remote modem and the remote bandwidth estimation module are provided at a stationary location.

8. The network communication system of claim 1, wherein the timing of the feedback information includes a measure of latency build up information in a queue for the low priority data packets, and wherein the local bandwidth estimation module operates to reduce a packet transmission rate in response to an increase in the measure of latency.

9. The network communication system of claim 8, wherein the timing of the feedback information includes a measure of latency build up information in a queue for the high priority data packets.

10. The network communication system of claim 1, wherein the higher ratio is 9:1.

11. The network communication system of claim 1, wherein the weather module collects the weather metrics from a third-party source.

12. The network communication system of claim 1, wherein the processed data packets are transmitted to the remote modem by one of a plurality of satellites, and wherein the radio frequency metrics includes antenna blockage information for each of the plurality of satellites.

13. A method for estimating bandwidth and controlling packet rate using at least two queues, the method comprising:
receiving data packets from a source;
categorizing the data packets into traffic class queues;
at a local bandwidth estimation module, dequeuing the data packets and marking the data packets as high priority packets or low priority packets;
at a local modem, processing the data packets by dequeuing the high priority data packets and the low priority data packets, the high priority data packets being dequeued at a higher ratio than the low priority data packets, wherein the modem transmits the processed packets to a remote location through a communications channel;
at a remote modem, receiving the processed data packets and forwarding the processed data packets to a remote bandwidth estimation module;
at the remote bandwidth estimation module, receiving the processed data packets and periodically transmitting feedback information back to a local bandwidth estimation module via high priority and low priority queues through the remote modem, communications channel and local modem, wherein the feedback information includes timing and a number of data packets received; and
at the local bandwidth estimation module, receiving the feedback information, determining data packet loss and jitter based on the feedback information, and increasing, decreasing or making no changes to packet rate for packets to be sent to the remote modem based on the packet loss and jitter.

14. The method of claim 13, wherein the communications channel is a satellite communications channel, and the data source is a local area network on a mobile vessel.

15. The method of claim 13 further comprising:
at the local bandwidth estimation module, reducing the packet rate when there is packet rate when there is packet loss in either the low priority queue or the high priority queue and there is no latency build up in either queue.

16. The method of claim 13, wherein determining packet loss comprises determining packet loss for the high priority queue and the low priority queue, and wherein the local bandwidth estimation module decreases the packet rate for packets to be sent to the remote modem when the packet loss for the high priority queue is less than the packet loss for the low priority queue.

* * * * *